United States Patent
Ndong et al.

(10) Patent No.: US 11,708,525 B2
(45) Date of Patent: Jul. 25, 2023

(54) METHOD OF ACIDIZING A SUBTERRANEAN FORMATION COMPRISING A GELLING AGENT

(71) Applicant: RHODIA OPERATIONS, Aubervilliers (FR)

(72) Inventors: Rose Ndong, Plainsboro, NJ (US); Olivier Back, Lyons (FR); Pascal Herve, Talence (FR); Jian Zhou, Langhorne, PA (US)

(73) Assignee: RHODIA OPERATIONS, Lyons (FR)

( * ) Notice: Subject to any disclaimer, the term of this patent is extended or adjusted under 35 U.S.C. 154(b) by 0 days.

(21) Appl. No.: 17/340,384

(22) Filed: Jun. 7, 2021

(65) Prior Publication Data

US 2021/0292639 A1    Sep. 23, 2021

Related U.S. Application Data

(62) Division of application No. 16/281,458, filed on Feb. 21, 2019, now Pat. No. 11,041,113.

(60) Provisional application No. 62/633,318, filed on Feb. 21, 2018.

(51) Int. Cl.
*E21B 43/26* (2006.01)
*C09K 8/72* (2006.01)
*C09K 8/76* (2006.01)

(52) U.S. Cl.
CPC ............... *C09K 8/72* (2013.01); *C09K 8/725* (2013.01); *C09K 8/76* (2013.01); *E21B 43/26* (2013.01); *C09K 2208/20* (2013.01); *C09K 2208/32* (2013.01)

(58) Field of Classification Search
CPC . C09K 8/72; C09K 8/76; C09K 8/725; C09K 2208/20; C09K 2208/32; E21B 43/26
See application file for complete search history.

(56) References Cited

U.S. PATENT DOCUMENTS

| | | | |
|---|---|---|---|
| 2003/0139298 A1* | 7/2003 | Fu ............................ | C09K 8/74 507/200 |
| 2017/0210966 A1* | 7/2017 | Jung ......................... | C09K 8/42 |
| 2017/0313928 A1* | 11/2017 | Li ............................. | C09K 8/602 |
| 2018/0086969 A1* | 3/2018 | Kadam .................. | E21B 21/003 |
| 2020/0283676 A1* | 9/2020 | Mao ....................... | C07C 231/12 |

\* cited by examiner

*Primary Examiner* — Silvana C Runyan
(74) *Attorney, Agent, or Firm* — Osha Bergman Watanabe & Burton LLP

(57) ABSTRACT

Methods of acidizing a subterranean formation penetrated by a wellbore that include the steps of (a) injecting into the wellbore at a pressure below subterranean formation fracturing pressure a treatment fluid having a first viscosity and including an aqueous acid and a gelling agent selected from the group consisting of Formulas I-XI and combinations thereof; (b) forming at least one void in the subterranean formation with the treatment fluid; and (c) allowing the treatment fluid to attain a second viscosity that is greater than the first viscosity.

7 Claims, 2 Drawing Sheets

METHOD OF ACIDIZING A SUBTERRANEAN FORMATION COMPRISING A GELLING AGENT

CROSS-REFERENCE TO RELATED APPLICATION

The present application is a divisional of U.S. application Ser. No. 16/281,458, filed Feb. 21, 2019, which claims the benefit of priority under 35 U.S.C. § 119(e) of U.S. Provisional Application Ser. No. 62/633,318, filed on Feb. 21, 2018. The entire contents of these applications are explicitly incorporated herein by this reference.

BACKGROUND

There are several stimulation treatments for increasing oil production, such as hydraulic fracturing and matrix acidizing. Hydraulic fracturing includes pumping specially-engineered fluids at high pressures into the formation in order to create fissures that are held open by the proppants present in the fluid once the treatment is completed.

In contrast, matrix acidizing is used for low permeability formations. It is a common practice to acidize subterranean formations in order to increase the permeability thereof. For example, in the petroleum industry, it is conventional to inject an acidizing fluid into a well in order to increase the permeability of a surrounding hydrocarbon-bearing formation, thereby facilitating the flow of hydrocarbons into the well from the formation. Such acidizing techniques are generally referred to as matrix acidizing treatments.

In matrix acidizing, the acidizing fluid is passed into the formation from the well at a pressure below the breakdown pressure of the formation. In this case, increase in permeability is affected primarily by the chemical reaction of the acid within the formation with little or no permeability increase being due to mechanical disruptions within the formation as in fracturing.

SUMMARY

Figure 1:
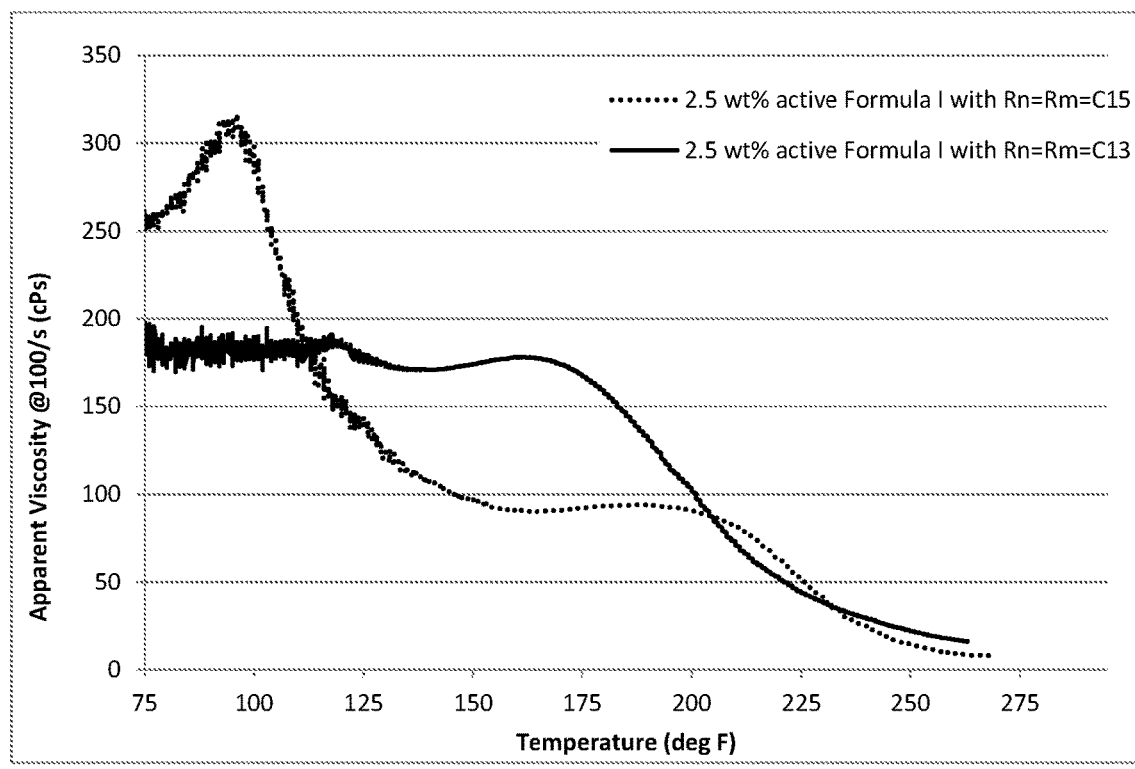
FIG. 1 is a graph displaying apparent viscosity as a function of temperature for 2.5 wt. % active gelling agent of Formula I in 22.8 wt % $CaCl_2$, corresponding to 15% HCl totally spent.

The present disclosure provides methods of acidizing a subterranean formation penetrated by a wellbore, wherein the method includes the steps of:

injecting into the wellbore at a pressure below subterranean formation fracturing pressure a treatment fluid having a first viscosity and including an aqueous acid and a gelling agent selected from:

Formula I:

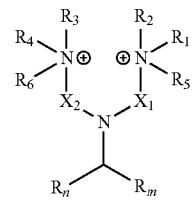

(I)

wherein: $R_n$ and $R_m$ independently represent a $C_3$-$C_{27}$ aliphatic group; $R_1$ to $R_4$ are the same or different at each occurrence and represent hydrogen or a $C_1$-$C_8$ alkyl group; $X_1$ and $X_2$ are the same or different at each occurrence and represent a linear or branched alkyl or alkenyl group; and $R_5$ and $R_6$ are the same or different at each occurrence and represent a moiety selected from the group consisting of —$O^-$, -Alk-CH(OH)—$CH_2$—$SO_3^-$ and -Alk-$CO_2^-$, wherein Alk represents an alkylene group;

Formula II:

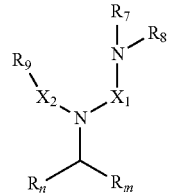

(II)

wherein: $R_n$ and $R_m$ independently represent a $C_3$-$C_{27}$ aliphatic group; $R_7$, $R_8$ and $R_9$ independently represent a moiety selected from the group consisting of —$O^-$, -Alk-CH(OH)—$CH_2$—$SO_3^-$, -Alk-$CO_2^-$, and -Alk-OH, wherein Alk represents an alkylene group; and $X_1$ and $X_2$ are the same or different at each occurrence and represent a linear or branched alkyl or alkenyl group;

Formula III:

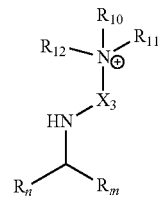

(III)

wherein: $R_n$ and $R_m$ independently represent a $C_3$-$C_{27}$ aliphatic group; $X_3$ is (—$CH_2$—)$_m$ with m being an integer from 2 to 20; $R_{10}$, $R_{11}$ and $R_{12}$ are the same or different at each occurrence and represent a moiety selected from the group consisting of Alk, —$O^-$, -Alk-CH(OH)—$CH_2$—$SO_3^-$ and -Alk-$CO_2^-$, wherein Alk is $CH_3$ or an alkylene group;

Formula IV:

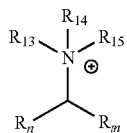
(IV)

wherein: $R_n$ and $R_m$ independently represent a $C_3$-$C_{27}$ aliphatic group and $R_{13}$ to $R_{15}$ are the same or different at each occurrence and represent an alkyl group;

Formula V:

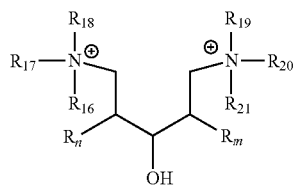
(V)

wherein: $R_n$ and $R_m$ independently represent a $C_3$-$C_{27}$ aliphatic group; $R_{16}$ to $R_{21}$ are the same or different at each occurrence and represent a moiety selected from the group consisting of —O$^-$, -Alk-CH(OH)—CH$_2$—SO$_3^-$, -Alk-CO$_2^-$, and -Alk-OH, wherein Alk represents an alkylene group;

Formula VI:

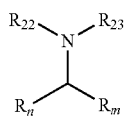
(VI)

wherein $R_n$ and $R_m$ independently represent a $C_3$-$C_{27}$ aliphatic group; and $R_{22}$ and $R_{23}$ are the same or different at each occurrence and represent a $C_1$-$C_8$ alkyl group;

Formula VII:

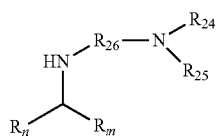
(VII)

wherein: $R_n$ and $R_m$ independently represent a $C_3$-$C_{27}$ aliphatic group; $R_{24}$ to $R_{26}$ are the same or different at each occurrence and represent a linear or branched alkyl or alkenyl group;

Formula VIII:

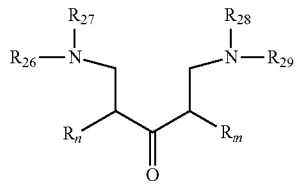
(VIII)

wherein: $R_n$ and $R_m$ independently represent a $C_3$-$C_{27}$ aliphatic group; $R_{26}$ to $R_{29}$ are the same or different at each occurrence and represent a linear or branched Alk-, wherein Alk represents an alkylene group;

Formula IX:

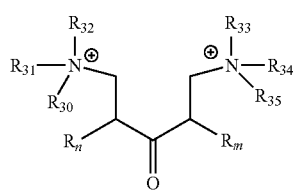
(IX)

wherein $R_n$, $R_m$ independently represent a $C_3$-$C_{27}$ aliphatic group; and $R_{30}$ to $R_{35}$ are the same or different at each occurrence and represent an alkyl group;

Formula X:

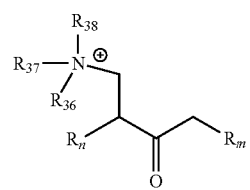
(X)

wherein $R_n$ and $R_m$ independently represent a $C_3$-$C_{27}$ aliphatic group; and $R_{36}$ to $R_{38}$ are the same or different at each occurrence and represent an alkyl group;

Formula XI:

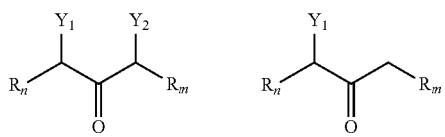
(XI)

wherein $R_n$ and $R_m$ independently represent a $C_3$-$C_{27}$ aliphatic group; and $Y_1$ and $Y_2$ are the same or different at each occurrence and represent a moiety selected from the group consisting of —O$^-$, SO$_3^-$, CO$_2^-$, -Alk-CH(OH)—CH$_2$—SO$_3^-$, -Alk-CO$_2^-$, and -Alk-SO$_3^-$, wherein Alk represents an alkylene group; and combinations thereof; forming at least one void in the subterranean formation with the treatment fluid; and allowing the treatment fluid to attain a second viscosity that is greater than the first viscosity.

In an embodiment, the gelling agent is present in an amount from about 0.1 wt % to about 15 wt % by total weight of the fluid in step (a).

In an embodiment, the treatment fluid further includes at least one solvent selected from water, alcohols, and combinations thereof. In another embodiment, the treatment fluid includes an alcohol selected from monohydric alcohols, dihydric alcohols, polyhydric alcohols, and combinations thereof. In another embodiment, the treatment fluid includes an alcohol selected from alkanols, alcohol alkoxylates, and combinations thereof. In yet another embodiment, the treatment fluid includes an alcohol selected from methanol, ethanol, isopropanol, butanol, propylene glycol, ethylene glycol, polyethylene glycol, and combinations thereof.

In an embodiment, the treatment fluid further includes one or more additives selected from corrosion inhibitors, iron control agents, clay stabilizers, calcium sulfate inhibitors, scale inhibitors, mutual solvents, non-emulsifiers, anti-slug agents and combinations thereof.

In another embodiment, a method of acidizing a formation penetrated by a wellbore is provided, wherein the method includes the steps of: injecting into the wellbore at a pressure below formation fracturing pressure a treatment fluid including an aqueous acid and a gelling agent comprising Formula I:

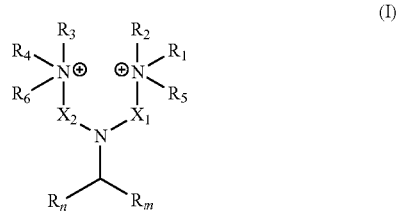

(I)

wherein: $R_n$ and $R_m$ independently represent a $C_3$-$C_{27}$ aliphatic group; $R_1$ to $R_4$ are the same or different at each occurrence and represent hydrogen or a $C_1$-$C_8$ alkyl group; $X_1$ and $X_2$ are the same or different at each occurrence and represent a linear or branched alkyl or alkenyl group; and $R_5$ and $R_6$ are the same or different at each occurrence and represent a moiety selected from —$O^-$, -Alk-CH(OH)—$CH_2$—$SO_3^-$ and -Alk-$CO_2^-$, wherein Alk represents an alkylene group; and allowing the treatment fluid to self-divert into the formation.

DETAILED DESCRIPTION

Described herein are methods of acidizing a subterranean formation penetrated by a wellbore that include the steps of (a) injecting into the wellbore at a pressure below subterranean formation fracturing pressure a treatment fluid having a first viscosity and including an aqueous acid and a gelling agent selected from the group consisting of Formulas I-XI and combinations thereof; (b) forming at least one void in the subterranean formation with the treatment fluid; and (c) allowing the treatment fluid to attain a second viscosity that is greater (e.g. more viscous) than the first viscosity. In some embodiments, the gelling agent is present in an amount from about 0.1 wt % to about 15 wt % by total weight of the fluid in step (a).

In an embodiment, the gelling agent is

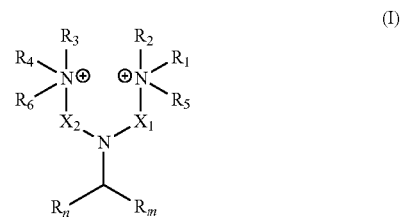

(I)

wherein: $R_n$ and $R_m$ independently represent a $C_3$-$C_{27}$ aliphatic group; $R_1$ to $R_4$, which may be the same or different at each occurrence, represent hydrogen or a $C_1$-$C_8$ alkyl group; $X_1$ and $X_2$, which may be the same or different at each occurrence, represent a linear or branched alkyl or alkenyl groups, generally from $C_3$-$C_{27}$ alkyl and $C_3$-$C_{27}$ alkenyl groups; and $R_5$ and $R_6$, which may be the same or different at each occurrence, represent a group selected from —$O^-$, -Alk-CH(OH)—$CH_2$—$SO_3^-$ and -Alk-$CO_2^-$ wherein Alk represents an alkylene group. In an embodiment, $R_n$ and $R_m$ represent a $C_3$-$C_{27}$ aliphatic group, very often a $C_3$-$C_{19}$ aliphatic group, often a aliphatic $C_7$-$C_{17}$ group. The number of carbon atoms of $R_n$ and $R_m$ can be even or odd numbers. $R_n$ and $R_m$ may be identical to each other or, alternatively, $R_n$ and $R_m$ may differ from each other.

The number of carbon atoms of $R_n$ and of $R_m$, as herein represented by the couple (n,m), can be notably any of the following couples:

(3,3), (5,5), (7,7), (9,9), (11,11), (13,13), (15,15), (17,17), (19,19), (21,21), (23,23), (25,25), (27, 27)

(7,9), (7,11), (7,13), (7,15), (7,17), (7,19), (7,21), (7,23), (7,25), (7,27)

(9,11), (9,13), (9,15), (9,17), (9,19), (9,21), (9,23), (9,25), (9,27)

(11,13), (11,15), (11,17), (11,19), (11,21), (11,23), (11,25), (11,27)

(13,15), (13,17), (13,19), (13,21), (13,23), (13,25), (13,27)

(15,17), (15,19), (15,21), (15,23), (15,25), (15,27)

(17,19), (17,21), (17,23), (17,25), (17,27)

(19,21), (19,23), (19,25), (19,27)

(21,23), (21,25), (21,27)

(23,25), (23,27) or (25,27).

The aliphatic groups $R_n$ and $R_m$ may be linear or branched. The aliphatic groups $R_n$ and $R_m$ may be free of any double bond and of any triple bond. Alternatively, the aliphatic groups $R_n$ and $R_m$ may comprise at least one —C=C— double bond and/or at least one —C≡C— triple bond. The aliphatic groups $R_n$ and $R_m$ are advantageously chosen from alkyl groups, alkenyl groups, alkanedienyl groups, alkanetrienyl groups and alkylnyl groups. Preferably, the aliphatic groups $R_n$ and $R_m$ are independently chosen from alkyl and alkenyl groups.

More preferably, the aliphatic groups $R_n$ and $R_m$ are independently chosen from alkyl and alkenyl groups, generally from $C_3$-$C_{27}$ alkyl and $C_3$-$C_{27}$ alkenyl groups, very often from $C_3$-$C_{19}$ alkyl and $C_3$-$C_{19}$ alkenyl groups and often from (i) $C_6$-$C_{17}$ alkyl and $C_6$-$C_{17}$ alkenyl groups or from (ii) $C_7$-$C_{17}$ alkyl and $C_7$-$C_{17}$ alkenyl groups. More preferably, $R_n$ and $R_m$ independently represent an alkyl group, generally a $C_3$-$C_{27}$ alkyl group, very often a $C_3$-$C_{19}$ alkyl group, often a $C_6$-$C_{17}$ alkyl group or a $C_7$-$C_{17}$ alkyl group.

$R_1$ to $R_4$, which may be the same or different at each occurrence in the compounds in accordance with the present invention, represent hydrogen or a $C_1$-$C_8$ alkyl group, preferably an alkyl group having from 1 to 6 carbon atoms and in particular may be methyl, ethyl, propyl, isopropyl, n-butyl, iso-butyl, or tert-butyl. In accordance with a particularly preferred embodiment $R_1$ to $R_4$ are methyl. If $R_1$ to $R_4$ are alkyl groups, they may be linear or branched.

$R_5$ and $R_6$, which may be the same or different at each occurrence, represent a group selected from —O$^-$, -Alk-CH(OH)—CH$_2$—SO$_3^-$ and -Alk-CO$_2^-$ wherein Alk represents a divalent alkylene group, which may be linear or branched. Alk represents preferably a $C_1$-$C_{20}$ alkylene group, preferably a $C_1$-$C_{12}$ alkylene group, more preferably a $C_1$-$C_8$ alkylene group. In accordance with particularly preferred embodiments Alk is —CH$_2$—, —CH$_2$—CH$_2$—, —CH$_2$—CH$_2$—CH$_2$—, —CH$_2$—CH(CH$_3$)—, —CH$_2$—CH(CH$_3$)—CH$_2$— and the most preferred Alk is a methylene group —CH$_2$—.

An example of Formula I (wherein $R_n$=$R_m$=$C_{27}$) is:

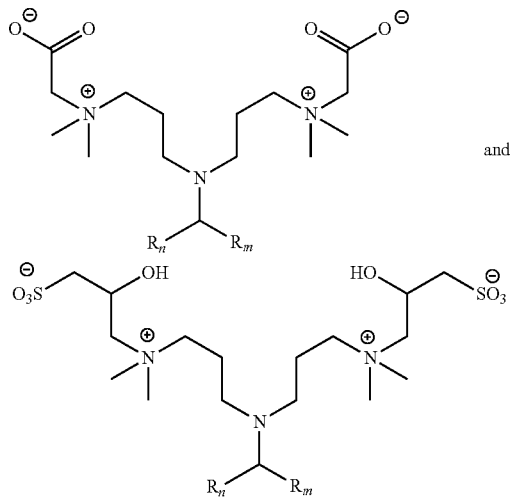

and

The present disclosure relates to gelling fluids (e.g. treatment fluids) and related methods of use for acidizing a subterranean formation. As used herein, the term "subterranean formation" includes areas below exposed earth as well as areas below earth covered by water such as sea or ocean water. In some embodiments, the subterranean formation includes a carbonate formation. In carbonate formations, the goal is usually to have the acid dissolve the carbonate rock to form highly-conductive fluid flow channels in the formation rock. In acidizing a carbonate formation, calcium and magnesium carbonates of the rock can be dissolved with acid. A reaction between an acid and the minerals calcite (CaCO$_3$) or dolomite (CaMg(CO$_3$)$_2$) can enhance the fluid flow properties of the rock. In some embodiments, the subterranean formation includes a sandstone formation. Most sandstone formations are composed of over 50-70% sand quartz particles, i.e. silica (SiO$_2$) bonded together by various amounts of cementing material including carbonate (calcite or CaCO$_3$) and silicates.

In an embodiment, the gelling fluid includes a gelling agent of Formula II:

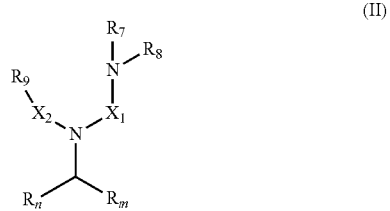

In Formula II, $R_n$, $R_m$, $X_1$ and $X_2$ are as described above in Formula I; $R_7$, $R_8$ and $R_9$ which may represent a group selected from —O$^-$, -Alk-CH(OH)—CH$_2$—SO$_3^-$ and -Alk-CO$_2^-$, -Alk-OH wherein Alk is also described in Formula I.

In another embodiment, the gelling fluid includes a gelling agent of Formula III:

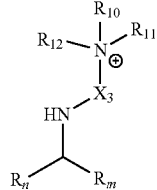

wherein $R_n$ and $R_m$ are as described in Formula I; $X_3$ is (—CH$_2$—)$_m$ with m being an integer equal to 2 or from 3 to 20; $R_{10}$, $R_{11}$ and $R_{12}$ are the same or different at each occurrence and represent a group selected from Alk, —O$^-$, -Alk-CH(OH)—CH$_2$—SO$_3^-$ and -Alk-CO$_2^-$ whereas Alk can be CH$_3$, or as described in Formula I.

In another embodiment, the gelling fluid includes a gelling agent of Formula IV:

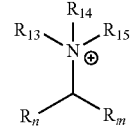

wherein $R_n$ and $R_m$ are as described in Formula I and $R_{13}$ to $R_{15}$, which may be the same or different at each occurrence, represent an alkyl group as defined in Formula I, more preferably a $C_1$-$C_8$ alkylene group.

In another embodiment, the gelling fluid includes a gelling agent of Formula V:

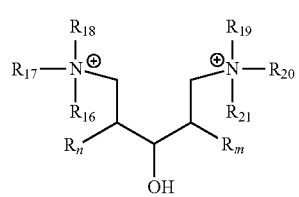

wherein $R_n$ and $R_m$ are as described in Formula I; $R_{16}$ to $R_{21}$ are the same or different and may represent a group selected from —O$^-$, -Alk-CH(OH)—CH$_2$—SO$_3^-$ and -Alk-CO$_2^-$, -Alk-OH wherein Alk is also described in Formula I, preferably $C_1$-$C_8$ alkyl group.

In another embodiment, the gelling fluid includes a gelling agent of Formula VI:

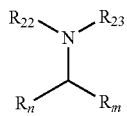

(VI)

wherein $R_n$ and $R_m$ are as described in Formula I; and $R_{22}$ and $R_{23}$, which may be the same or different at each occurrence, represent a $C_1$-$C_8$ alkyl group.

In another embodiment, the gelling fluid includes a gelling agent of Formula VII:

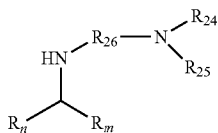

(VII)

wherein $R_n$ and $R_m$ are as described in Formula I; $R_{24}$ to $R_{26}$, which may be the same or different at each occurrence, represent a linear or branched alkyl or alkenyl groups, generally from $C_1$-$C_{27}$ alkyl and $C_3$-$C_{27}$ alkenyl groups.

In another embodiment, the gelling fluid includes a gelling agent of Formula VIII:

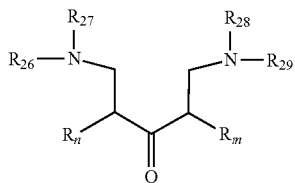

(VIII)

wherein $R_n$ and $R_m$ are as described in Formula I; $R_{26}$ to $R_{29}$, which may be the same or different at each occurrence, represent a linear or branched Alk- whereas Alk is defined in Formula I. Alk represents preferably a $C_1$-$C_{20}$ alkylene group, preferably a $C_1$-$C_{12}$ alkylene group, more preferably a $C_1$-$C_8$ alkylene group. In accordance with particularly preferred embodiments Alk is —$CH_2$—, —$CH_2$—$CH_2$—, —$CH_2$—$CH_2$—$CH_2$—, —$CH_2$—$CH(CH_3)$—, —$CH_2$—$CH(CH_3)$—$CH_2$— and the most preferred Alk is a methylene group —$CH_2$—.

In another embodiment, the gelling fluid includes a gelling agent of Formula IX:

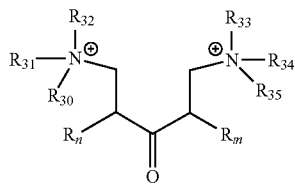

(IX)

wherein $R_n$, $R_m$ are as described in Formula I; and $R_{30}$ to $R_{35}$, which may be the same or different at each occurrence, represent an alkyl group as defined in Formula I, more preferably a $C_1$-$C_8$ alkylene group.

In another embodiment, the gelling fluid includes a gelling agent of Formula X:

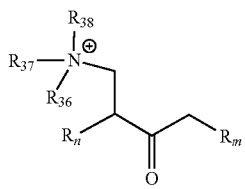

(X)

wherein $R_n$ and $R_m$ are as described in Formula I; and $R_{36}$ to $R_{38}$, which may be the same or different at each occurrence, represent an alkyl group as defined in Formula I, more preferably a $C_1$-$C_8$ alkylene group.

In another embodiment, the gelling fluid includes a gelling agent of Formula XI:

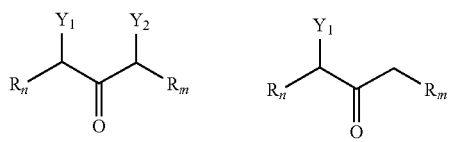

(XI)

wherein $R_n$ and $R_m$ are as described in Formula I; and $Y_1$ and $Y_2$, which may be the same or different at each occurrence, represent —$O^-$, $SO_3^-$, $CO_2^-$, -Alk-CH(OH)—$CH_2$—$SO_3^-$ and -Alk-$CO_2^-$, -Alk-$SO_3^-$ wherein Alk is also described in Formula I, preferably $C_1$-$C_8$ alkyl group.

The gelling agent is present in an amount suitable for use in an acidizing process. In an embodiment, the gelling agent is present in an amount from about 0.1 wt % to about 15 wt % active by total weight of the fluid. In another embodiment, the gelling agent is present in an amount from about 2.5 wt % to about 10 wt % active by total weight of the fluid.

In an embodiment, the gelling fluid further includes at least one solvent selected from water, alcohols, and combinations thereof. In an embodiment, the gelling fluid includes an alcohol selected from monohydric alcohols, dihydric alcohols, polyhydric alcohols, and combinations thereof. In another embodiment, the gelling fluid includes an alcohol selected from alkanols, alcohol alkoxylates, and combinations thereof. In another embodiment, the gelling fluid includes an alcohol selected from methanol, ethanol, isopropanol, butanol, propylene glycol, ethylene glycol, polyethylene glycol, and combinations thereof.

Each individual solvent is present in the gelling fluid in an amount suitable for use in an acidizing process. In an embodiment, the amount of each individual solvent in the gelling fluid ranges from 0 wt % to about 30 wt % by total weight of the fluid, with the total amount of solvent in the formulation ranging from about 10 wt % to about 70 wt % by total weight of the fluid. In an embodiment, the gelling fluid includes a gelling agent according to Formula I in an amount of 40 wt % active, with the remainder being water:isopropanol in a ratio of 60:40 wherein the amounts are by total weight of the fluid.

Optionally, the gelling fluid further includes one or more additives. In an embodiment, the fluid includes one or more additives selected from corrosion inhibitors, iron control agents, clay stabilizers, calcium sulfate inhibitors, scale inhibitors, mutual solvents, non-emulsifiers, anti-slug agents and combinations thereof. In an embodiment, the corrosion inhibitor is selected from alcohols (e.g. acetylenics); cationics (e.g. quaternary ammonium salts, imidazolines, and alkyl pyridines); and nonionics (e.g. alcohol ethoxylates).

In an embodiment, a treatment fluid suitable for use in an acidizing process includes a gelling fluid and an aqueous acid. Suitable aqueous acids include those compatible with any gelling agents of Formulas I-XI for use in an acidizing process. In an embodiment, the aqueous acid is selected from hydrochloric acid, hydrofluoric acid, formic acid, acetic acid, sulfamic acid, and combinations thereof. In an embodiment, the treatment fluid includes acid in an amount up to 30 wt % by total weight of the fluid.

Also provided is a method of acidizing a formation penetrated by a wellbore that includes the steps of injecting into the wellbore at a pressure below formation fracturing pressure a treatment fluid that includes a gelling fluid and an aqueous acid and allowing the treatment fluid to acidize the formation and/or self-divert into the formation. As used herein, the term, "self-divert" refers to a composition that viscosifies as it stimulates the formation and, in so doing, diverts any remaining acid into zones of lower permeability in the formation.

In an embodiment, a method of acidizing a subterranean formation penetrated by a wellbore includes the steps of (a) injecting into the wellbore at a pressure below subterranean formation fracturing pressure a treatment fluid having a first viscosity and comprising an aqueous acid and a gelling agent of Formula Ia:

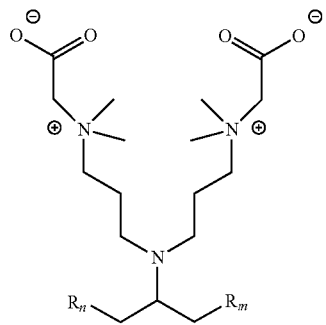

wherein $R_n$ and $R_m$ are the same and are $C_{13}$ or $C_{15}$ or a blend of pure $C_{13}$ and $C_{15}$ of Formula Ia molecules; (b) forming at least one void in the subterranean formation with the treatment fluid; and (c) allowing the treatment fluid to attain a second viscosity that is greater than the first viscosity. As used herein, the term "void(s)" is meant to encompass cracks, fractures, wormholes (e.g. highly branched flow channels), and the like. In another embodiment, the method further includes forming at least one void in the subterranean formation with the treatment fluid after the fluid has attained the second viscosity. In another embodiment, the method further includes reducing the viscosity of the treatment fluid to a viscosity that is less than the second viscosity. In another embodiment, the method further includes recovering at least a portion of the treatment fluid.

The methods and compositions of the present disclosure can be used in subterranean formations having a variety of operational conditions. For example, the methods and compositions of the present disclosure can be used in a variety of temperatures. In an embodiment, the step of forming at least one void in the subterranean formation with the treatment fluid occurs in a temperature range up to about 300° F. (149° C.). Besides a wide temperature range, the contact time in which the compositions are used can also be varied. In an embodiment, the step of forming at least one void in the subterranean formation with the treatment fluid can occur in a contact time that ranges from about one hour to several hours; or alternatively, from about one hour to about eight hours. Other process conditions that can be varied will be apparent to those of skill in the art and are to be considered within the scope of the present disclosure.

The present disclosure will further be described by reference to the following examples. The following examples are merely illustrative and are not intended to be limiting.

EXAMPLES

Example 1—Treatment Fluid

Figure 2:
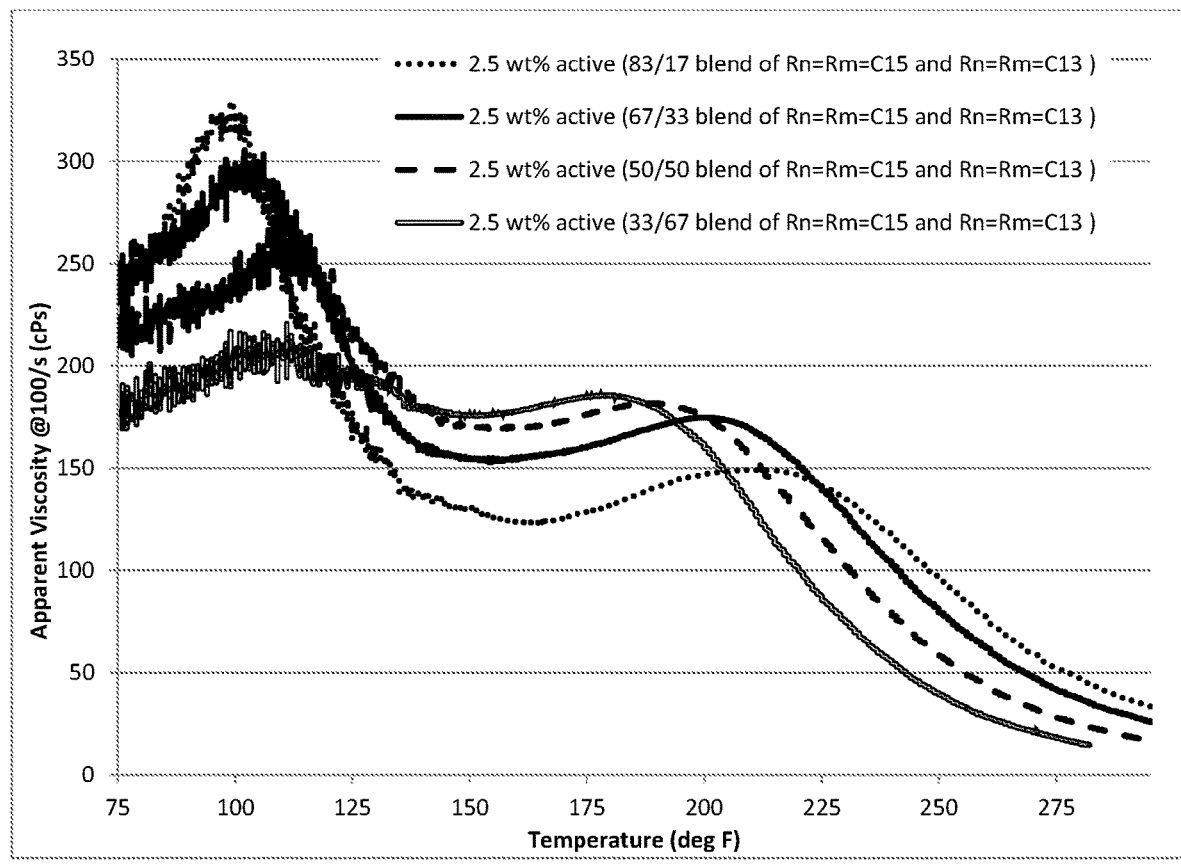
FIG. 2 is a graph displaying apparent viscosity as a function of temperature for 2.5% active gelling agent of composed of a blend of two molecules of Formula I in 22.8 wt % $CaCl_2$, corresponding to 15% HCl totally spent.

The compatibility of the gelling agent of Formula I in spent acid was investigated. The treatment fluid was prepared by blending the gelling agent in of Formula I, acid additives (if as needed) and $CaCl_2$ solution at high shear rate (7000-10000 rpm). The resulting blend was centrifuged to remove any bubbles. The obtained fluid was tested under pressure at a constant shear rate of 100/s using a high pressure, high temperate rheometer from room temperature to 400° F. FIG. 1 and FIG. 2 show the viscosity as a function of temperature of 2.5 wt. % active of the gelling agent in 22.8 wt % $CaCl_2$, which corresponds to 15% HCl being totally spent.

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

What is claimed is:

1. A method of acidizing a subterranean formation penetrated by a wellbore, wherein the method comprises the steps of:
   a. injecting into the wellbore at a pressure below subterranean formation fracturing pressure a treatment fluid having a first viscosity and comprising an aqueous acid and a gelling agent of:
   Formula I:

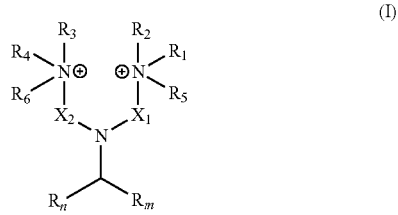

wherein: Rn, and Rm independently represent a C3-C27 aliphatic group; R1 to R4 are the same a C1-C8 alkyl group; $X_1$ and $X_2$ are the same at each occurrence and represent a linear alkyl group; and R5 and R6 are —O, b. forming at least one void in the subterranean formation with the treatment fluid; and
   c. allowing the treatment fluid to attain a second viscosity that is greater than the first viscosity.

2. The method of claim 1, wherein the gelling agent is present in an amount from about 0.1 wt % to about 15 wt % by total weight of the fluid in step (a).

3. The method of claim 1, wherein the treatment fluid further comprises at least one solvent selected from the group consisting of water, alcohols, and combinations thereof.

4. The method of claim 3, wherein the treatment fluid comprises an alcohol selected from the group consisting of monohydric alcohols, dihydric alcohols, polyhydric alcohols, and combinations thereof.

5. The method of claim 3, wherein the treatment fluid comprises an alcohol selected from the group consisting of alkanols, alcohol alkoxylates, and combinations thereof.

6. The method of claim 3, wherein the treatment fluid comprises an alcohol selected from the group consisting of methanol, ethanol, isopropanol, butanol, propylene glycol, ethylene glycol, polyethylene glycol, and combinations thereof.

7. The method of claim 1, wherein the treatment fluid further comprises one or more additives selected from the group consisting of corrosion inhibitors, iron control agents, clay stabilizers, calcium sulfate inhibitors, scale inhibitors, mutual solvents, non-emulsifiers, anti-slug agents and combinations thereof.

* * * * *